Aug. 6, 1946.  C. R. CARPENTER  2,405,401
APPARATUS FOR TREATING FIBROUS MATERIALS
Filed Aug. 14, 1943  6 Sheets-Sheet 1
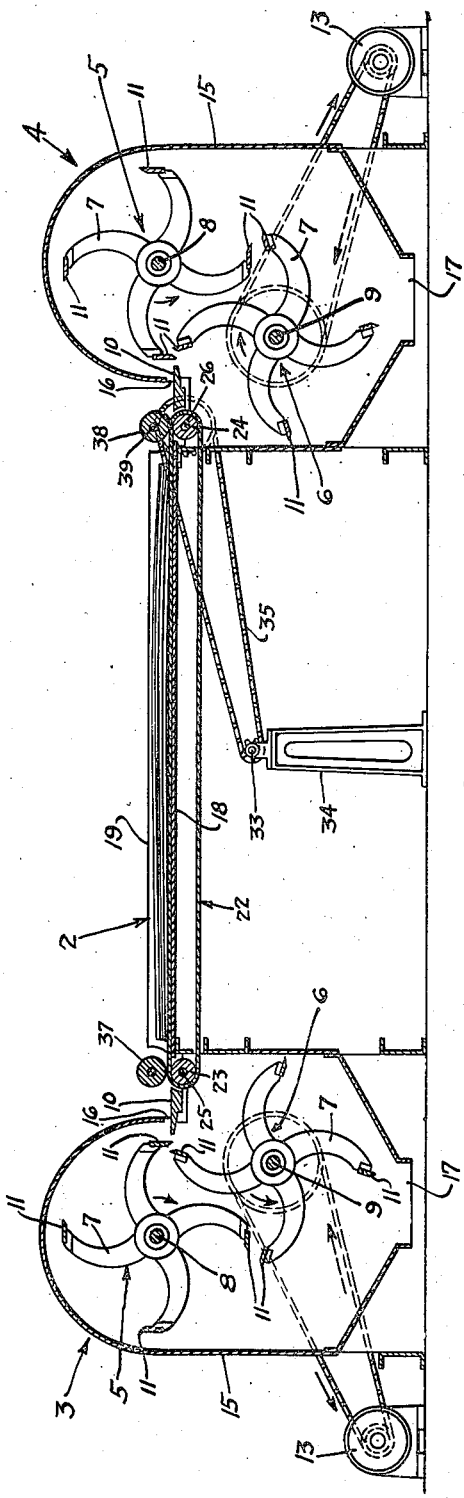
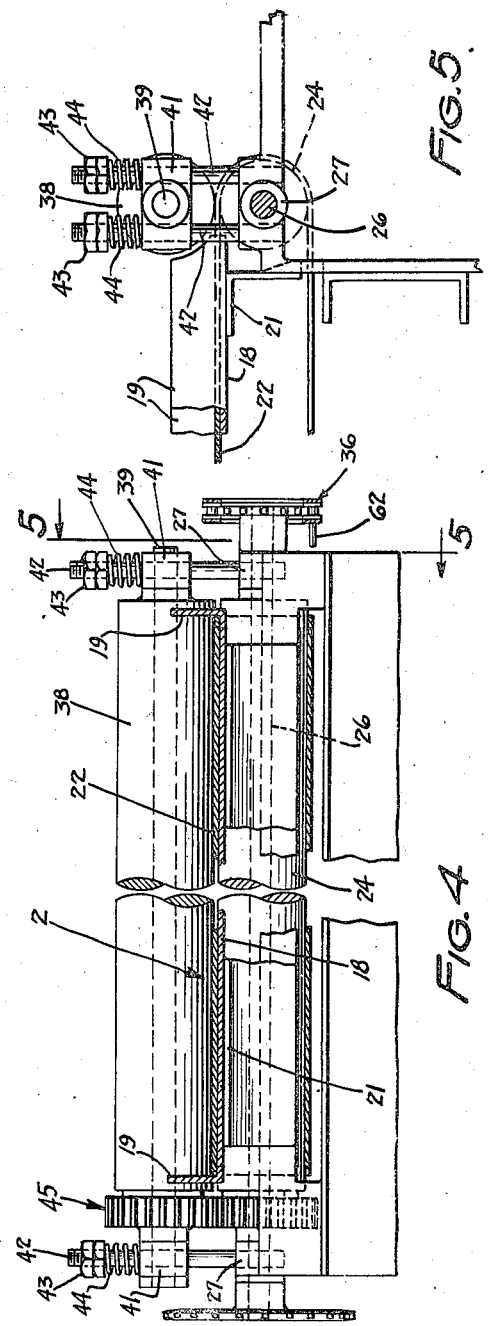
INVENTOR
CHARLES R. CARPENTER
By Paul, Paul & Moore
ATTORNEYS

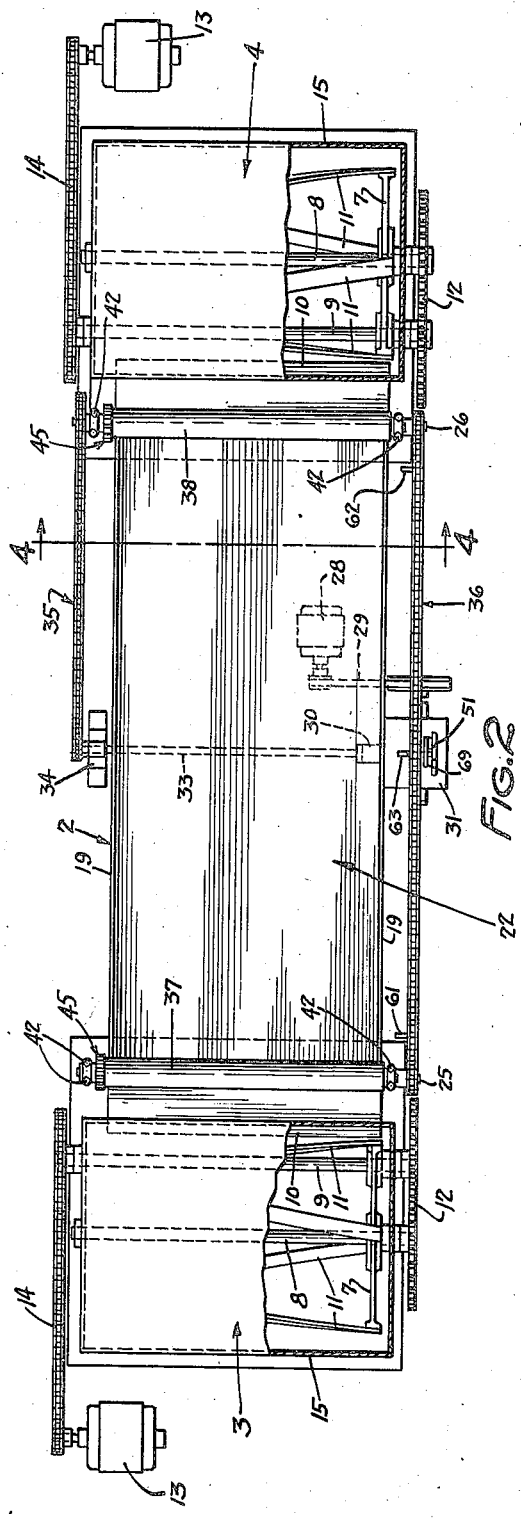
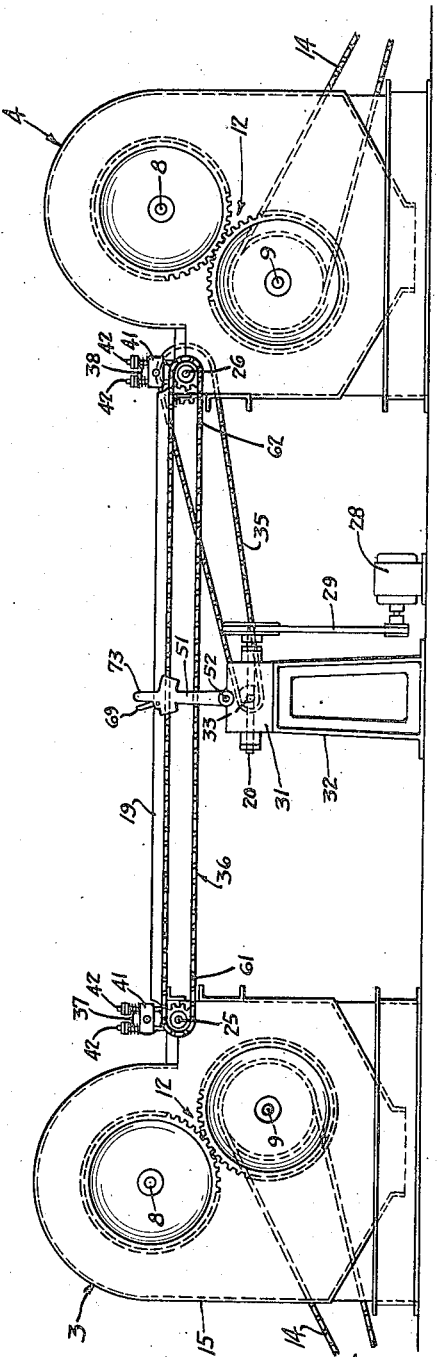

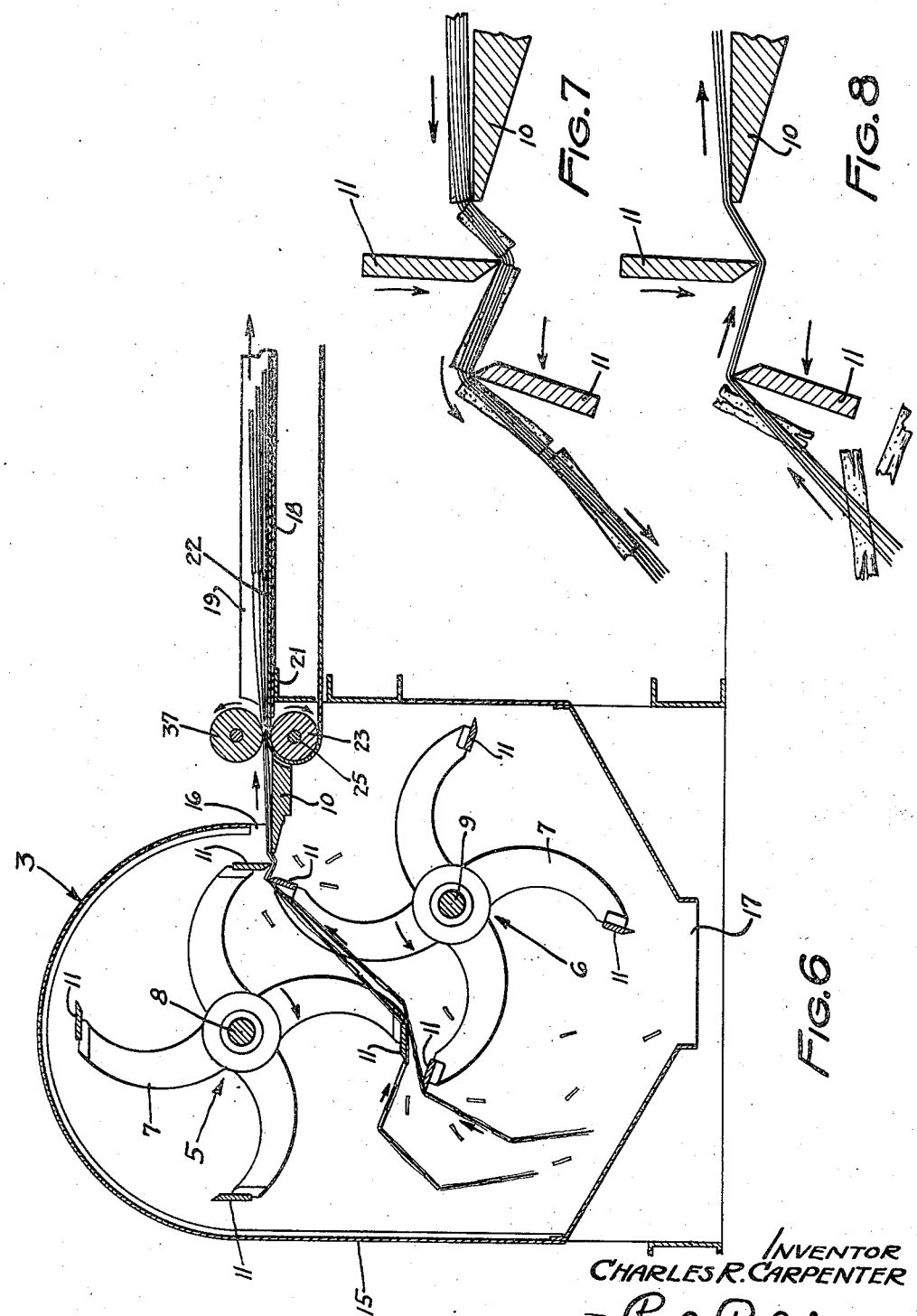

Aug. 6, 1946.    C. R. CARPENTER    2,405,401
APPARATUS FOR TREATING FIBROUS MATERIALS
Filed Aug. 14, 1943    6 Sheets-Sheet 4

INVENTOR
CHARLES R. CARPENTER
By Paul, Paul & Moore
ATTORNEYS

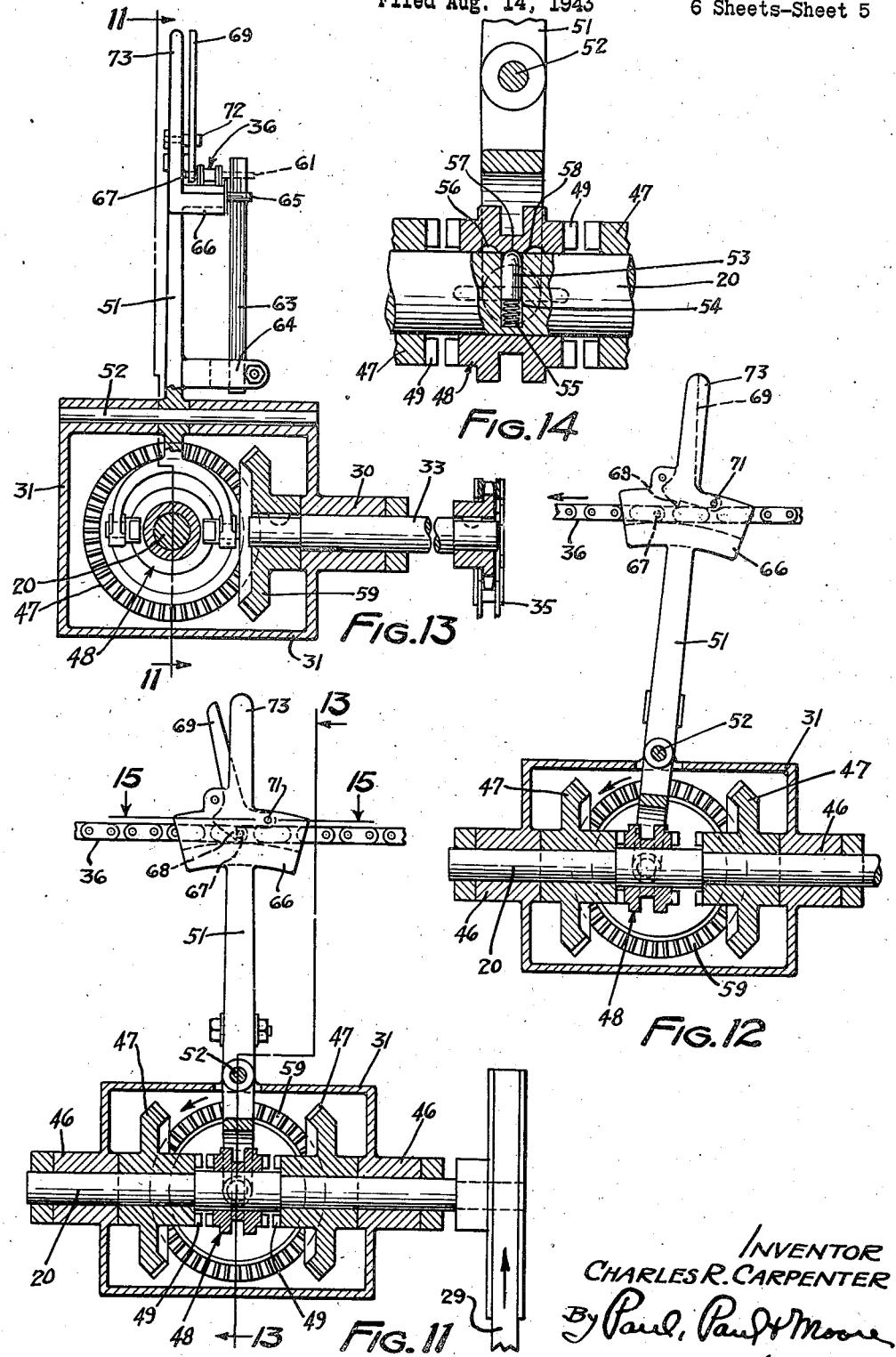

INVENTOR
CHARLES R. CARPENTER
ATTORNEYS

Patented Aug. 6, 1946

2,405,401

UNITED STATES PATENT OFFICE 2,405,401

APPARATUS FOR TREATING FIBROUS MATERIALS

Charles R. Carpenter, Robbinsdale, Minn.

Application August 14, 1943, Serial No. 498,669

5 Claims. (Cl. 19—33)

This invention relates to new and useful improvements in apparatus for treating fiber producing materials such as hemp, sisal grass, flax, and other fibrous materials, to separate the fibers from the usual woody and pithy matter of the stalks.

In the treatment of hemp and other similar fiber producing materials to render it applicable for commercial use, it is highly desirable that all of the woody and pithy matter of the stalks be thoroughly and completely removed or separated from the fibers, whereby the fibers may be used in the manufacture of high grade rope, cordage, and various other sundry articles made from such fibers, and the purpose of the present invention is to provide an improved apparatus for thus removing from the fibers, all waste material such as the usual woody and pithy matter, in a highly efficient and expeditious manner, whereby the cost of salvaging the fiber is reduced to a minimum.

Numerous attempts have heretofore been made to develop an apparatus which could efficiently and completely separate or remove all of the woody and pithy matter from the fibers of such material as hemp, but to the best of my knowledge none of these have proven entirely satisfactory. Such an apparatus is disclosed in the patent to J. N. Selvig, #1,601,984. In the apparatus therein disclosed, the fiber producing material is fed between suitable rotary beaters which operate to alternately bend the fiber stalks, first in one direction, and then in the opposite direction, whereby the woody and pithy matter, which constitutes the bodies of the stalks, is broken into a plurality of short pieces which has the effect of loosening and more or less freeing the woody and pithy matter from the fibers. After thus breaking the stalks or woody matter into short lengths, the beaters are intended to scutch or remove all of the loosened woody and pithy matter from the fibers. While this method has proven satisfactory to a limited extent, it has not resulted in complete removal of all of the woody and pithy matter from the fibers.

It is therefore highly desirable that some means be provided whereby all of the woody and pithy matter of the stalks of fiber producing material may be completely and thoroughly separated or removed from the fibers without breaking the fibers or otherwise causing damage thereto.

The novel apparatus herein disclosed was developed after considerable experimental work in an effort to produce a machine which is capable of thoroughly and completely separating the fibers from the usual woody and pithy matter of the stalks without breaking or otherwise damaging the fibers or losing any of the fibers in the operation of thus separating them from the woody and pithy matter.

In accordance with the present invention, a bundle of the fiber producing material to be treated, usually in the form of stalks, is placed on a suitable supporting table or feed belt. One end of the bundle of stalks is then fed into a scutching mechanism comprising a pair of rotatably mounted beaters which engage the stalks from opposite sides, first one side and then the other, whereby the woody and pithy matter of each stalk is broken into a plurality of short lengths to facilitate separating it from the fibers. After one end of the bundle of stalks has thus been fed between the rotating beaters at one end of the belt, the feeding movement of the belt is reversed, whereby the fibers of the ends of the stalks first fed into a beater are withdrawn therefrom without interrupting rotation of the beaters. Such reverse movement of the fibers relative to the direction of rotation of the beaters, results in the beater bars engaging the fibers with a more or less scraping action, whereby all of the woody and pithy matter is completely removed or separated from the fibers, and with the assurance that the finished fibers will be of maximum length.

A further object of the invention is to provide an apparatus of the class described comprising two sets of spaced apart scutching mechanisms, each comprising a pair of rotatably mounted coacting beaters, and each scutching mechanism having a feed roller which cooperates with a conveyer belt to feed the fibrous material into their respective scutching mechanisms and withdrawing the fibers therefrom, said conveyer belt extending between the feed rollers and having a driving connection therewith, and means being provided for driving said belt and rollers first, in one direction to feed one end of a bundle of stalks positioned on the feed belt into feeding engagement with the feed roller at one end of the belt and into its respective scutching mechanism or beaters, whereby the woody and pithy matter of portions of the stalks is separated from the fibers, after which the operation of the belt is reversed, whereby the fibers resulting from the first treated ends of the stalks are withdrawn from the first scutching mechanism or set of beaters, and the opposite ends of the stalks are then fed into the scutching mechanism at the opposite end of the belt, whereby the remaining portions of the stalks are acted upon by the second scutching mechanism to remove the remainder of the woody and pithy matter from the fibers, after which the feeding movement of the belt is again reversed to withdraw the fibers of the remaining portions of the stalks from the second set of beaters, the belt automatically coming to rest in its normal position with all of the fibers of the treated stalks positioned thereon, free of the feed rollers, whereby the cleaned fibers may readily be removed from the belt to permit another bundle of stalks to be placed thereon to receive similar treatment.

Other objects of the invention reside in the provision of a simple and inexpensive apparatus for separating or removing all of the woody and pithy matter from the fibers of fiber producing materials such as hemp, and the like, whereby all of the waste material of the stalks may be completely removed from the fibers without breaking or otherwise damaging the fibers; in the provision of a novel method of treating fiber producing materials to remove the fibers therefrom which consists in longitudinally feeding the stalks of raw material to be treated between continuously rotating coacting beaters to effect a breaking and loosening of the woody and pithy matter of the stalks, and thereafter withdrawing the fibers from the beaters without interrupting their rotation, whereby the beaters will completely and thoroughly remove all of the undesirable material from the fibers; in the novel construction of the driving means for the feed rollers and belt, and the control means therefor; and in the provision of an apparatus for treating fiber producing materials which requires a minimum of labor and wherein the operating mechanisms are so arranged and constructed that the apparatus is not dependent upon the services of a skilled operator for its operation.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a longitudinal sectional view through the machine with some of the parts omitted, showing the feed belt in its normal rest position;

Figure 2 is a plan view of Figure 1;

Figure 3 is a view similar to Figure 1, but showing the front or outside of the machine;

Figure 4 is an enlarged detail sectional view on the line 4—4 of Figure 2, showing the spring pressed feed roller at each end of the table;

Figure 5 is a detail sectional view on the line 5—5 of Figure 4, showing the relation between the feed roller and belt at each end of the feed belt;

Figure 6 is an enlarged diagrammatic view to more clearly illustrate the scutching action of the beater bars on the fibers, when the fibers are withdrawn from between the beater bars;

Figure 7 is an enlarged detail sectional view showing the action of the beater bars on the stalks, when fed therebetween by the feed rolls at one end of the belt;

Figure 8 is a view similar to Figure 7, showing the efficient scutching action of the beater bars on the fibers as a result of the effective edges of the beater bars engaging the fibers in a direction against their traveling movement, whereby the beater bars engage the fibers with a scraping action which very effectively separates the fibers from the woody and pithy matter;

Figure 11 is an enlarged detail sectional view on the line 11—11 of Figure 13, showing the reversible clutch for controlling the operation of the feed belt, the control lever being shown in neutral position;

Figure 12 is a view showing the control lever positioned to drive the feed belt in the direction indicated by the arrows in Figure 9;

Figure 13 is a sectional view on the line 13—13 of Figure 11;

Figure 14 is an enlarged detail sectional view thru the clutch showing the spring actuated bolt or pin for retaining the clutch in its operative position;

Figure 9:
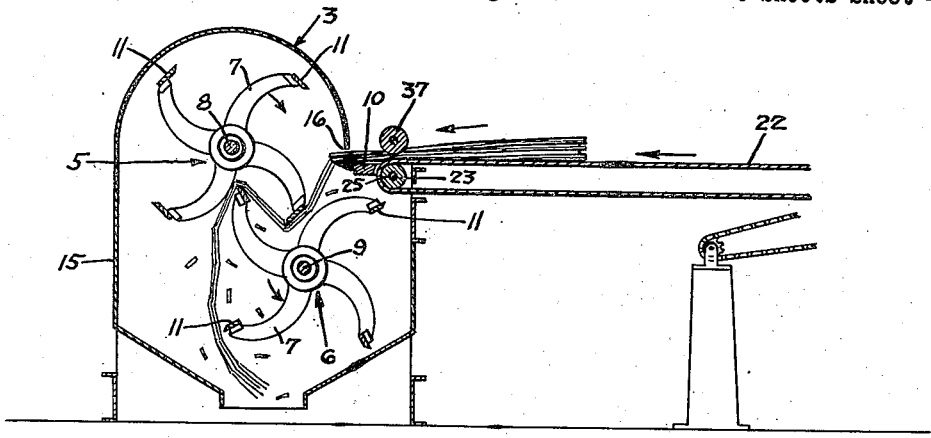
Figure 9 is a view similar to Figure 6 on a similar scale, showing the stalks of fibrous material being fed into the beaters or scutching device at one end of the feed belt.

The novel apparatus herein disclosed is shown comprising a feed table, generally designated by the numeral 2, provided at each end with a scutching mechanism, generally designated by the numerals 3 and 4. These scutching mechanisms are arranged in opposed relation, as best shown in Figure 1, and each having a pair of rotatably mounted coacting beaters 5 and 6. Each beater comprises a plurality of spiders 7 mounted upon shafts 8 and 9, respectively. Beater bars 11 are secured to the arms of the spiders and are preferably spirally formed as indicated in Figure 2. A stationary bar 10 is positioned at each end of the feed table 2, over which the stalks are fed into engagement with the beater bars 11 of the beaters 5 for the first break.

The shafts 8 and 9 of each scutching mechanism are operatively connected together by suitable gears 12 for rotation in opposite directions, as shown in Figure 2, and said mechanisms may be driven from suitable motors 13 thru chain drives 14 connecting the motors to their respective beater shafts 9.

The beaters of each scutching mechanism 3 and 4 are mounted within suitable housing 15 having a receiving opening 16 arranged in alignment with the feed table 2 thru which the stalks of the fiber producing material are fed into the scutching devices as will readily be understood by reference to Figure 1. Each housing 15 is provided at its bottom with a suitable discharge opening 17 thru which the waste material removed from the fibers, such as the woody and pithy matter, may discharge from the casing thru a suitable receiving means, not shown.

The scutching mechanisms herein disclosed are shown and described in detail in the patent hereinbefore mentioned, and it is therefore believed unnecessary to further describe them in detail.

An important feature of the present invention resides in the arrangement of the scutching mechanisms 3 and 4 with respect to the feed table 2, and whereby the material may be fed first between the beaters of one scutching mechanism, and then into the beater of the opposed scutching mechanism as will be understood.

The feed table 2 is shown comprising a top plate 18 provided with side walls 19. The plate or table top 18 may be suitably supported at its ends upon angle brackets 21 secured to the adjacent wall of the housings 15, as shown in Figures 1, 4 and 5, or, if desired, it may be otherwise supported, it being understood that it is arranged in fixed relation between the two scutching mechanisms 3 and 4, as shown in Figure 1.

An endless belt 22 has its upper run supported on the table top 18. The width of the belt is such as to fit freely between the side walls 19 of the table 2, as shown in Figure 4. The belt is supported on a pair of rollers 23 and 24 mounted on shafts 25 and 26, respectively, journaled in suitable bearings 27, indicated in Figures 4 and 5. The belt is shown driven by a motor 28 having a belt or chain drive 29 connecting it to a clutch shaft 20 mounted in a housing 31 shown mounted upon a pedestal 32, as shown in Figure 3. One end of a cross shaft 33 is supported in a bearing 30 in the housing 31, as shown in Figure 13, and its opposite end is shown supported on a suitable pedestal 34. A chain drive 35 provides a driving connection between the cross shaft 33 and shaft 26 of the belt roller 24, as disclosed in Figures 1, 2 and 3.

The shafts 25 and 26 at each end of the feed table are operatively connected together by a chain 36 which also serves as a timing chain for controlling the operation of the control means, subsequently to be described. Suitable means, not shown, is provided for taking up slack in the belt 22 and chain 36.

Power driven feed rollers 37 and 38 are provided at the ends of the belt and are in feeding engagement with the upper run of the belt to positively feed the stalks of the fibrous material into the scutching mechanisms 3 and 4, and for withdrawing the cleaned fibers therefrom as will readily be understood.

Each feed roller 37 and 38 is mounted on a shaft 39 journaled in bearing blocks 41 mounted for sliding movement upon suitable vertical guide studs or pins 42 having their lower ends fixed to a suitable support such as the frames of the scutching mechanisms as will be understood by reference to Figure 5. The upper ends of the studs 42 are threaded to receive adjusting nuts 43, between which and the upper surfaces of the bearing blocks 41, suitable springs 44 are interposed. The springs 44 serve to constantly force the feed rollers 37 and 38 into feeding engagement with the upper run of the belt 22, as will readily be understood by reference to Figures 4 and 5. The feed rollers 37 and 38 are adapted for positive rotation by suitable gear drives 45 shown in Figure 4. The diameter of the rollers 37 and 38 are such that the peripheral speeds thereof are equal to the driven speed of the belt 22 as will be understood by reference to Figures 1 and 5. In other words the rollers 23 and 24 which support the belt 22 are slightly smaller in diameter than the feed rollers 37 and 38 thereby to make allowance for the thickness of the belt as will be understood.

Another important feature of the present invention resides in the novel means provided for automatically controlling the operation of the belt 22 and feed rollers 37 and 38 each time the belt is set into motion by the operator, after placing a bundle of hemp stalks on the belt.

The means provided for thus controlling the operation of the belt is best shown in Figures 11 to 20, inclusive, and comprises a reversible clutch which is enclosed within the housing 31, as shown in Figures 11 and 12. The clutch shaft 20, hereinbefore mentioned, is shown mounted in suitable bearings 46 provided on the housing 31, and opposed bevel or miter gears 47 are loosely mounted upon the shaft 20 within the housing. A clutch member 48 is slidably mounted upon the shaft 20 between the gears 47 and has clutch teeth adapted to engage complementary clutch teeth 49 provided on the adjacent faces of hubs of the gears 47. The clutch member 48 is non-rotatably supported on the shaft 20 by a suitable spline, as is customary in devices of this general type, and is adapted to be shifted from neutral position, shown in Figure 11, to an operative position in engagement with one or the other of the gears 47 by means of a suitable lever 51. The lever 51 is mounted for pivotal movement on a pivot 52 supported in the upper portion of the housing 31.

To retain the clutch member 48 in a selected position, a suitable spring-actuated pin 53 is mounted in a bore 54 within the shaft 20, as best shown in Figure 14. A suitable spring 55 is positioned in the bottom of the bore 54 and constantly urges the pin in a direction to engage one of a plurality of indentations 56, 57 or 58 provided in the bore of the clutch member 48. The spring-actuated pin 53 serves to retain the clutch member in any one of its three positions whereby the clutch member is not likely to accidentally shift its position when the apparatus is in operation.

The loosely mounted gears 47 on the clutch shaft 20 are in constant mesh with a similar shaped gear 59 keyed to one end of the cross shaft 33, as best shown in Figure 13. The clutch shaft 20 rotates continually due to its driving connection with the motor 28 thru the belt or chain drive 29, see Figures 2 and 3. Thus, when the clutch member 48 is in neutral position as shown in Figure 11, the driving connection between the cross shaft 33 and clutch shaft 20 is interrupted whereby the feed belt 22 and feed rollers 37 and 38 are at rest. The scutching mechanisms, however, may continue to operate as a result of being equipped with individual motors, as shown in Figures 1 and 2. If desired, the scutching mechanisms may be otherwise driven without departing from the scope of the invention.

As hereinbefore stated the chain 36, in addition to providing a positive driving connection between the rollers 23 and 24 upon which the belt 22 is mounted, also functions as a control means for the operation of the belt. To thus control the operation of the belt, the chain 36 is shown provided with two laterally projecting pins 61 and 62 which are adjustably supported in the chain by suitable means, not shown.

The pins 61 and 62 project inwardly in a direction towards the belt 22, as shown in Figure 2, and are adapted to alternately engage a resilient arm 63 having its lower end secured in a bracket 64 provided on the control lever 51, as best shown in Figure 13.

Figure 17:
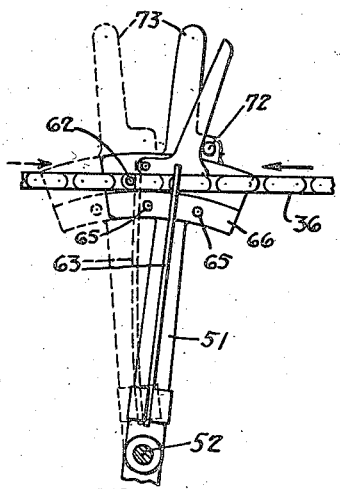
Figure 17 is a view showing the control lever in another of its operative positions to reverse the direction of the feed belt from the position of the lever shown in Figure 16.
Figure 19:
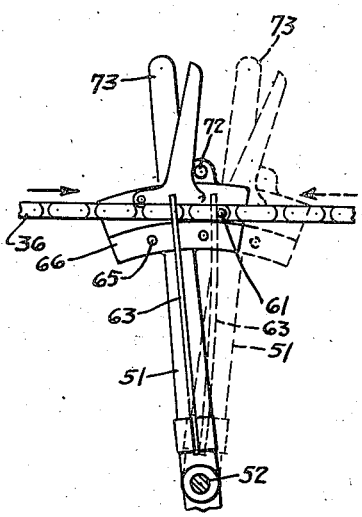
Figure 19 is a view similar to Figure 18 showing the means provided on the chain for shifting the clutch.

The upper end portion of the resilient arm 63 is positioned in the path of the pins 61 and 62 whereby when one of said pins engages the arm 63, said arm will flex until the tension in the arm 63 overcomes the resistance exerted on the clutch member 48 by the spring-actuated pin 53, whereupon the clutch lever 51 will be automatically shifted from one driving position to the other, as indicated by the full and dotted lines in Figures 17 and 19. Suitable limit stops 65 are preferably provided in an offset portion 66 of the clutch lever 51 to limit flexing movement of the upper end of the arm 63 when engaged by one of the pins in the chain.

Figure 16:
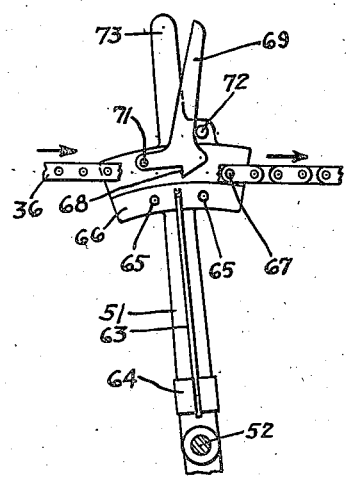
Figure 16 is a view looking at the control lever in one of its operative positions.
Figure 20:
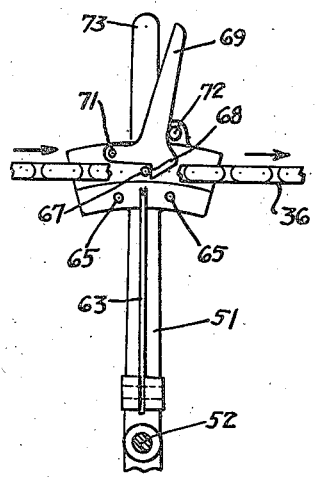
Figure 20 is a view showing the clutch control lever in neutral position.
Figure 15:
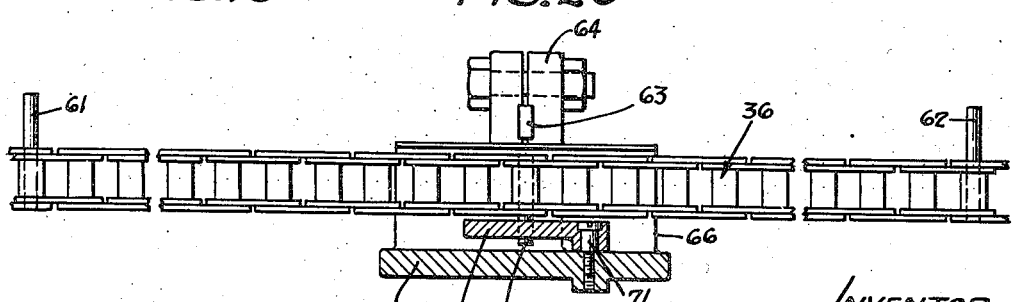
Figure 15 is an enlarged detail sectional view on the line 15—15 of Figure 11.

To return the conveyer belt to its normal inoperative position at the termination of each cycle of operation thereof, a pin 67 is mounted in the chain 36 at the opposite side thereof adapted to engage a shoulder 68 of a latch 69 pivoted at 71 to the upper portion of the clutch lever 51. The shoulder 68 of the latch 69 is normally positioned in the path of the pin 67, as shown in Figures 16 and 20, whereby when the pin 67 is moving in the direction indicated by the arrows in Figure 20, the pin 67 will engage the shoulder 68 and move the clutch lever 51 into its neutral position, shown in Figure 20, whereupon the belt and feed rollers 37 and 38 come to rest. A suitable limit stop 72 may be provided on the upper portion of the lever 51 to retain the latch 69 in its normal position, shown in Figure 16.

As hereinbefore stated, one of the outstanding features of the novel method herein disclosed in the treatment of fiber producing material such as hemp, to separate the fiber from the woody and pithy matter thereof, resides in that particular portion of the operation wherein the feeding travel of the hemp stalks into each scutching mechanism is reversed without interrupting the rotation of the beaters of said mechanisms, which results in the beater bars effecting a scraping action upon the fibers as they are withdrawn from each scutching mechanism against the movement of beater bars thereof. Such scraping action of the beater bars upon the fibers effects a thorough and complete removal of all waste material from the fibers, whereby a high grade product is assured. Furthermore, in accordance with the present method the operation of separating the fibers from the usual waste may be accomplished in a comparatively short space of time, as the single operation of feeding the fiber producing material or hemp stalks into the scutching mechanism and immediately withdrawing the fibers therefrom, is sufficient to effect a complete separation of the fibers from the waste, even though the material being treated may be damp or partially wet.

Operation

In the operation of treating a fiber producing material such as hemp, the scutching mechanisms 3 and 4 are preferably first set in operation by starting their motors 13. As a matter of convenience, and to facilitate starting and stopping the entire apparatus, the driving means for the two scutching mechanisms 3 and 4, such as the motors 13 and the motor 28 for driving the clutch shaft 20, may be electrically connected in such a manner that their operation may be controlled by a single control switch. After the scutching mechanisms and clutch shaft have been set into motion, the operator places a bundle of hemp stalks upon the upper run of the feed belt 22, as indicated in Figure 1. Before starting the belt the stalks are spread out over the full width thereof between the side walls 19 of the table.

The operator then grasps the handle portion 73 of the control lever 51 and also the latch 69 and shifts the lever from its neutral position shown in Figures 11 and 20, to the full line position shown in Figures 12, 16, and 19. Such shifting of the lever 51 will cause the clutch 48 to move into engagement with the gear 47 shown at the left hand side of Figure 12, which will start the belt 22 and cause its upper run to travel in a direction to feed the stalks into engagement with the feed roller 37 shown at the left hand side of Figure 1. This roller cooperates with the belt to positively feed the stalks into scutching mechanism 3. As the stalks are fed thru the receiving opening 16 in the casing 15 of scutching mechanism 3, the beater bars 11 of the upper beater 5 will engage the stalks and bend them downwardly at a sharp angle, as shown for example in Figure 7, over the edge of the stationary bar 10. At about the same time the beater bars 11 of the other beater 6 will engage the stalks from their bottom sides and bend them upwardly or in the opposite direction, whereby the woody and pithy matter of the stalks is broken into a plurality of small pieces, as clearly shown in Figures 6 and 7.

The belt and feed roller 37 continues to feed the stalks into scutching mechanism 3 until at least one-half the length of the stalks have been fed into engagement with the beater bars 11 of the two beaters thereof. The control pin 62 is so positioned in the chain 36 that when more than half the length of the stalks have been subjected to the scutching and breaking action of the beater bars of scutching mechanism 3, said pin will engage the upper end of the flexible arm 63 of the control lever 51, as indicated in Figure 17, and thereby shift the control lever from the dotted to the full line position shown in Figure 17. When the lever 51 is so shifted, clutch member 48 will drivingly engage the gear wheel 47 at the right hand side of Figure 12.

Such shifting of the clutch member 48 will immediately reverse the feeding travel of the feed belt 22 in a direction towards scutching mechanism 4, whereupon the fibers of those portions of the stalks initially fed into scutching mechanism 3, are withdrawn therefrom by the action of the belt and feed roller 37, without interrupting rotation of the beaters 5 and 6 of scutching mechanism 3. Such withdrawal of the fibers from between the beaters of scutching mechanism 3 will cause the beater bars thereof to engage the fibers with a more or less scraping action which completely and thoroughly removes all of the woody and pithy matter from the fibers without danger of breaking the fibers or otherwise damaging them.

In Figure 7 I have shown the breaking action imparted to the woody and pithy matter of the stalks when fed between the beater bars 11 of the coacting beaters 5 and 6, while in Fig. 8 I have shown the scraping action imparted to the fibers as they are forcibly withdrawn from between the beaters 5 and 6, when the operation of the feed belt and feed rollers is reversed.

Figure 10:
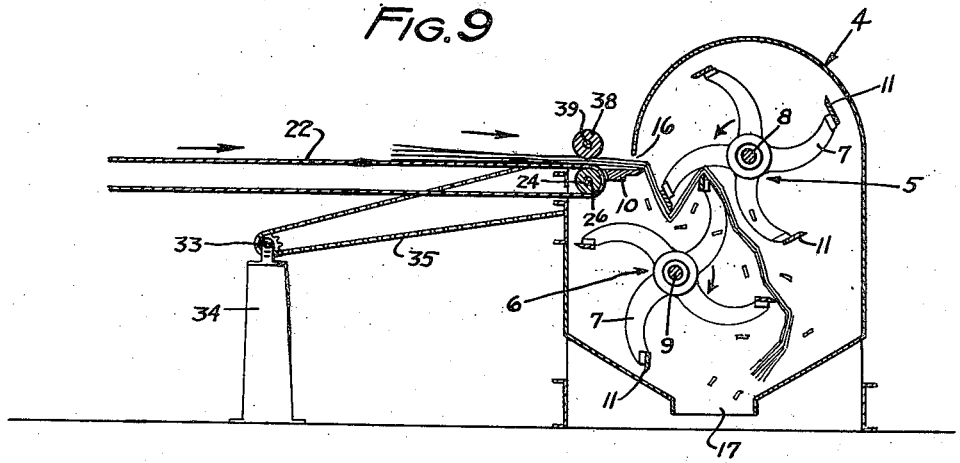
Figure 10 is a view similar to Figure 9 showing the opposite ends of the stalks being fed into the scutching device at the opposite end of the feed belt.

Immediately following the shifting of the control lever 51 by the control pin 62, the upper run of the belt 22 and the feed rollers 37 and 38 will reverse the feeding movement of the stalks, whereupon the opposite untreated ends thereof are fed into scutching mechanism 4, as shown in Figure 10. The opposite ends of the stalks are fed into scutching mechanism 4 until all of the untreated portions of the stalks have been engaged by the beater bars. The spacing between the control pins 61 and 62 in the chain is such that when all of the untreated portions of the hemp stalks have been fed into scutching mechanism 4 the control pin 61 engages the flexible arm 63, as indicated in dotted lines in Figure 19, and shifts the control lever from the dotted to the full line position shown in this figure. Such shifting of the control lever will reverse the operation of the belt and the feed rollers 37 and 38, whereupon the fibers are withdrawn from scutching mechanism 4 in a manner similar to that described with reference to the withdrawal of the fibers from scutching mechanism 3.

As the fibers are withdrawn from scutching mechanism 4, the stop pin 67 carried on the outside of the belt 36 approaches the shoulder 68 of the latch 69 and subsequently engages it and shifts the control lever into its neutral position, shown in Figures 11 and 20. Such automatic shifting of the control lever completes the cycle of operation and interrupts the feeding travel or movement of the upper run of the feed belt 22 and also the rotation of the feed rollers 37 and 38. The belt subsequently comes to rest in the position from which it started shown in Figure 1, whereby all of the cleaned fibers will be positioned upon the belt, out of engagement with the feed rollers 37 and 38, whereby they may readily be removed from the feed belt or table by the operator to make room for another bundle of stalks.

When the control lever 51 is in its neutral position as shown in Figures 11 and 20, the stop pin 67 will be positioned substantially as shown in Figure 20, in engagement with the shoulder 68 of the latch 69. When the operator shifts the control lever in the operation of initially starting the feed belt and feed rollers, the lever is shifted from the position shown in Figure 20 to the full line position shown in Figure 19, whereupon the belt starts in the direction indicated by the full line arrows in these two figures.

Figure 18:
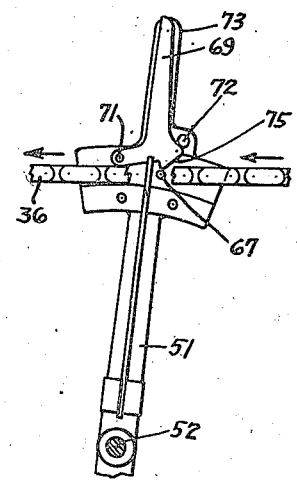
Figure 18 is a view similar to Figure 17 showing the latch pin passing under the latch.

Because of the latch 69 normally being in the position shown in Figure 20, the latch must be so shaped or designed that when the operation of the feed belt and feed rollers has been automatically reversed, and the upper run of the chain 36 is traveling in the direction of the arrow in Figure 18, the stop pin 67 may pass under the latch 69 without imparting any movement to the control lever 51. The latch member is therefore provided with an inclined face 75, which when engaged by the stop pin 67, will cause the latch to pivot about its pivot 71, as will be understood by reference to Figure 18, without imparting movement to the control lever 51.

As hereinbefore stated, the outstanding feature of this invention over all other known apparatus designed for a similar purpose, resides in that portion of each cycle of operation wherein the fibers are withdrawn from the beaters of each scutching mechanism without interrupting the operation of the beaters. The results achieved as result of the scraping action imparted to the fibers by the beater bars, when withdrawing the fibers from between the beaters, are outstanding in that it makes it possible to obtain complete and thorough separation of the waste material from the fibers in the simple operation of alternately feeding the stalks into each scutching mechanism and withdrawing the fibers therefrom.

It is well known that hemp fibers have great strength, and the breaking and scutching action of the beaters on the stalks may therefore be so adjusted as to impart a rather severe scutching action to the fibers. If the material to be treated is dry and the woody and pithy matter of the stalks is quite brittle, the waste matter may more readily and easily be separated from the fibers than when the stalks are wet or perhaps partially green. However, it has been found from actual experience that the novel apparatus herein disclosed will effect thorough and complete separation of the fibers even though the stalks may be damp, wet, or partially green when fed into the beaters. The thorough separation of the foreign matter from the fibers is achieved primarily because of the scraping action imparted to the fibers when they are withdrawn from between the beaters against the direction of movement of the beater bars thereon. Such complete separation of the foreign matter from the fibers has heretofore been practically impossible to attain with conventional equipment, wherein the stalks are fed into a scutching mechanism and the fibers passed directly therethru in one direction and substantially without interruption.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. In an apparatus of the class described a conveyor belt constituting a feed table, a pair of feed rolls at each end of the conveyor belt, a chain operatively connecting together said feed rolls and conveyor belt for operation in the same feeding direction, a scutching mechanism at each end of the feed belt into which the hemp stalks are alternately fed by the feeding action of said belt and feed rolls, a reversible clutch operatively connected to the feed belt and feed rolls, manually operable means for rendering the clutch operable to drive the belt and feed rolls in one direction to feed at least one-half the lengths of the hemp stalks supported on the belt into one of said scutching mechanisms, means carried by said chain for actuating the clutch to automatically reverse the operations of the conveyor belt and feed rolls whereby the opposite ends of the hemp stalks are fed into the other of said scutching mechanisms, other means carried by the chain for again reversing the conveyer belt and feed rolls thereby to withdraw the fibers from the second scutching mechanism, the withdrawal of the fibers from the constantly rotating scutching mechanisms causing all of the woody and pithy matter to be removed therefrom, and a stop element also carried by said chain and so related to the clutch that when the conveyer belt and feed rolls have been actuated to feed the fibers, first into one scutching mechanism and then into the other scutching mechanism, said stop element will shift the clutch into neutral and thereby automatically interrupt further operation of the apparatus.

2. In an apparatus of the class described, a conveyer belt constituting a feed table, coacting feed rolls at each end of the conveyer belt, an endless chain operatively connecting together the feed rolls at each end of the belt for operation in the same feeding direction and in the direction of belt travel, a scutching mechanism at each end of the feed belt into which the hemp stalks are alternately fed by the feeding action of the belt and feed rolls, a reversible clutch operatively connected to the feed belt and feed rolls, means whereby the clutch may be rendered operable to drive the belt and feed rolls in one direction to feed portions of the hemp stalks into one of said scutching mechanisms, clutch-actuating pins carried by said chain, means connected to the clutch and positioned in the path of travel of said pins, said pins being spaced apart on the chain and so-arranged that when at least half the lengths of the hem stalks have been fed into said first mentioned scutching mechanism, one of said pins will engage the clutch control means and shift the clutch to reverse the direction of travel of the feed belt and feed rolls, whereby the opposite ends of the hemp stalks are fed into the second scutching mechanism, the other of said clutch-actuating pins subsequently engaging and actuating the clutch control means to drive the feed belt and feed rolls in the direction of initial feeding travel, and a stop pin carried by the chain adapted to shift the clutch into neutral position, when the feed belt is returned to its normal position, whereby the belt will come to rest with the cleaned fibers supported thereon, the reversal of the feed belt and feed rolls causing all of the fibers of the hem stalks to be withdrawn from the scutching mechanisms free of the woody and pithy matter of the hemp stalks.

3. In an apparatus of the class described an endless conveyer belt constituting a feed table, coacting feed rolls at each end of the conveyer belt, a drive chain operatively connecting together the feed rolls at each end of the belt for operation in the same feeding direction and in the direction of belt travel, a scutching mechanism at each end of the feed belt into which the hemp stalks are alternately fed by the feeding action of the belt and feed rolls, a reversible clutch for controlling the operation of the feed belt and feed rolls, a control lever for rendering the clutch operable to initially drive the belt and feed rolls in one direction to feed the hemp stalks into one of said scutching mechanisms, a pair of control pins carried by said chain, a resilient arm carried by the control lever and positioned in the path of travel of said pins, said pins being adapted to alternately engage said resilient arm and shift the clutch from one position to the other, whereby when the feed belt and roll have been initially started to feed portions of the hemp stalks into one of said scutching mechanisms, by manipulation of the control lever, one of said pins will subsequently engage said arm and automatically shift the clutch into position to reverse the feed belt and feed rolls, whereby the remaining portions of the hemp stalks are fed into the scutching mechanisms at the opposite end of the feed belt whereby all of the hemp stalks will be scutched their entire lengths, after which the other of said clutch-actuating pins will engage the resilient arm and shift the control lever clutch into position to drive the feed belt and feed rolls in the opposite direction, and a stop pin carried by the chain adapted to engage a latch member on the control lever and shift the control lever and clutch into neutral position, when the feed belt is returned to its normal starting position, the reversing of the feed belt and feed rolls causing all of the fibers of the hemp stalks to be withdrawn from the scutching mechanism and to be positioned upon the feed belt, when said belt comes to rest at the end of its cycle of operation, whereby the cleaned fibers, free from woody and pithy matter, may be removed from the feed belt and a fresh bundle of hemp stalks positioned thereon for scutching treatment.

4. In an apparatus for separating the woody and pithy matter from hemp fibers, a scutching mechanism, a pair of feed rolls for feeding the major portions of the hemp stalks into said scutching mechanism, whereby a breaking action is effected on the woody and pithy matter of the hemp stalks, a second scutching mechanism having a pair of feed rolls, a drive for operatively connecting the feed rolls of the first mentioned scutching mechanism to the feed rolls of the second scutching mechanism, a control mechanism for automatically intermittently reversing the operation of said drive and thereby intermittently reversing the rotation of the feed rolls, whereby the fibers are withdrawn from the first scutching mechanism and the remaining untreated portions of the hemp stalks are fed into the second scutching mechanism, thereby to subject the woody and pithy matter thereof to a similar breaking action, said control mechanism comprising a reversible clutch having a control arm positioned to be oscillated by said drive, first in one direction and then in the opposite direction, whereby all of the fibers are eventually withdrawn from the scutching mechanisms, the withdrawal of the fibers from said scutching mechanisms causing all of the woody and pithy matter to be removed from the hemp fibers.

5. In an apparatus of the class described, a feed table comprising a conveyer belt, a pair of feed rolls at each end of the belt, means for simultaneously driving said feed rolls and belt in the same feeding direction, a scutching mechanism at each end of the feed table adapted to alternately receive hemp stalks from said feed rolls, control means for automatically causing said drive means to drive said belt and feed rolls, first in one direction to feed portions of the hemp stalks into one of said scutching mechanisms, and then in the opposite direction to feed the opposite ends of the hemp stalks into and out of the other of said scutching mechanisms, after which the belt is brought to rest in its normal starting position with the cleaned fibers supported thereon, said control means including a reversible clutch, having a pivoted arm and an endless chain having control elements thereon adapted to engage and actuate the clutch arm.

CHARLES R. CARPENTER.